United States Patent
Huang

(10) Patent No.: US 8,471,966 B2
(45) Date of Patent: Jun. 25, 2013

(54) PROJECTION SYSTEM

(75) Inventor: Yung-Lun Huang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 245 days.

(21) Appl. No.: 13/030,734

(22) Filed: Feb. 18, 2011

(65) Prior Publication Data

US 2012/0069253 A1 Mar. 22, 2012

(30) Foreign Application Priority Data

Sep. 16, 2010 (TW) .................................. 99131487

(51) Int. Cl.
*G02F 1/1335* (2006.01)
(52) U.S. Cl.
USPC .................................................. 349/9; 349/5
(58) Field of Classification Search
USPC ................ 349/5, 9, 113, 114, 57, 96, 95, 65, 349/63; 362/97.2, 339, 611, 612, 613, 615
See application file for complete search history.

(56) References Cited

U.S. PATENT DOCUMENTS

| 5,890,786 A * | 4/1999 | Kurematsu ...................... 353/20 |
| 7,872,722 B2 * | 1/2011 | Kimura .......................... 349/141 |
| 2007/0258018 A1 * | 11/2007 | Tain et al. ......................... 349/9 |
| 2008/0137328 A1 * | 6/2008 | Lee et al. ....................... 362/224 |

* cited by examiner

*Primary Examiner* — Thoi Duong
(74) *Attorney, Agent, or Firm* — Altis Law Group, Inc.

(57) ABSTRACT

A projector includes a light source module, a light guide plate, a polarizing splitter (PBS) module, and a reflection device. The light source module is configured for emitting light. The light guide plate includes a light incident surface, a light output surface, and a light reflection surface. The light source is aligned with the light incident surface. The PBS module includes a polarizing splitter and a LCOS panel. The polarizing splitter is aligned with the light output surface and includes a first mounting surface and a second mounting surface. The polarizing splitter reflects s-polarization light and allows p-polarization light to pass therethrough. The LCOS panel on the second mounting surface modulates the s-polarization light into light with display information signal and reflects the light with display information signal to a projection lens. The reflection device on the first mounting surface reflects the p-polarization light into the projection lens for projection.

13 Claims, 1 Drawing Sheet

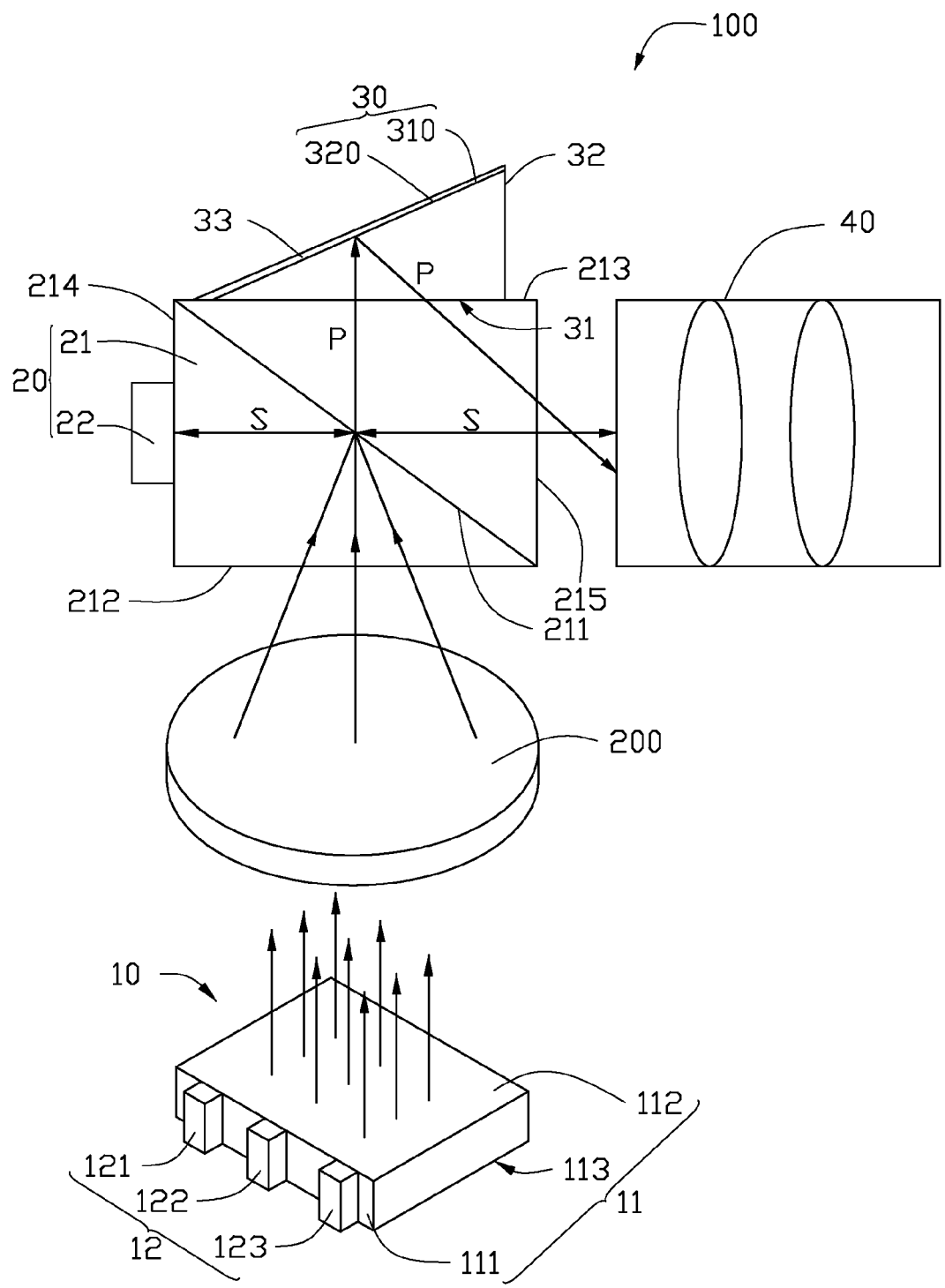

PROJECTION SYSTEM

BACKGROUND

1. Technical Field

The present disclosure relates to projection systems, and particularly to a projection system based on Liquid Crystal on Silicon (LCOS).

2. Description of Related Art

LCOS projection systems often include a light source, a polarizing splitter (PBS), a LCOS panel, and a projection lens. The PBS is configured for splitting the light emitted from the light source into a p-polarization light and an s-polarization light perpendicular to the p-polarization light. The LCOS panel corresponds to the PBS and modulates the s-polarization light into a projected light with display information signal to the projection lens for projection.

However, in the described LCOS projection systems, the PBS allows the p-polarization light to pass therethrough without being utilized, in other words, the utilization ratio of the light source is only 50%, which limits brightness.

What is needed, therefore, is a projection system to overcome the described limitations.

BRIEF DESCRIPTION OF THE DRAWINGS

The FIGURE is a schematic view of a projection system according to an exemplary embodiment.

DETAILED DESCRIPTION

Referring to the FIGURE, a projection system 100, according to an exemplary embodiment, is shown. The projection system 100 includes a light source module 10, a polarizing splitter (PBS) module 20, a reflection device 30, and a projection lens 40.

The light source module 10 includes a light guide plate 11 and a light source unit 12. The light guide plate 11 is substantially rectangular and includes a first light incident surface 111, a first light output surface 112 and a light reflection surface 113. The first light output surface 112 and the light reflection surface 113 are formed on two opposite sides of the light guide plate 11. The first light incident surface 111 is connected to the first light output surface 112 and the light reflection surface 113.

The light source unit 12 includes LEDs comprising a red light source 121, a green light source 122, and a blue light source 123. The red light source 121, the green light source 122, and the blue light source 123 face the first light incident surface 111. In the present embodiment, the red light source 121, the green light source 122, and the blue light source 123 are directly arranged on the first light incident surface 111. In one embodiment, a number of micro-structured reflection units (not shown) are formed on the light reflection surface 113 for uniformly mixing incident light.

The PBS module 20 faces the first light output surface 112 of the light guide plate 11. The PBS module 20 includes a polarizing splitter 21 and a LCOS panel 22. The polarizing splitter 21 is substantially a cube formed by two isosceles right angle prisms and includes a second light incident surface 212, a first mounting surface 213 opposite to the second light incident surface 212, a second mounting surface 214 perpendicular to and connecting the second light incident surface 212 and the first mounting surface 213, a second light output surface 215, and a polarizing splitting surface 211 formed between two contacting surfaces of the two isosceles right angle prisms. The polarizing splitting surface 211 is a diagonal plane of the polarizing splitter 21. The polarizing splitting surface 211 reflects an s-polarization light and allows a p-polarization light to pass therethrough. The LCOS panel 22 is positioned on the second mounting surface 214 of the polarizing splitter 21 and configured for modulating the incident s-polarization light into light with display information signal. The LCOS panel 22 also reflects the light with display information signal to the projection lens 40.

The projection lens 40 is positioned near the second light output surface 215 of the polarizing splitter 21 and projects the light with display information signal onto a screen (not shown).

The projection system 100 further includes a concentrating lens 200 between the first light output surface 112 of the light guide plate 11 and the second light incident surface 212 of the polarizing splitter 21. In the present embodiment, the concentrating lens 200 is a Fresnel lens. The concentrating lens 200 concentrates light from the light guide plate 11.

The reflection device 30 on the first mounting surface 213 of the polarizing splitter 21 is configured for reflecting the p-polarization light transmitted from the polarizing splitting surface 211 into the projection lens 40. In this embodiment, the reflection device 30 includes a transparent glass 310 and a reflection film 320. The transparent glass 310 is rectangular in shape and includes a first side 31, a second side 32 and a hypotenuse 33. The first side 31 on the first mounting surface 213 of the polarizing splitter 21. An included angle between the first side 31 and the hypotenuse 33 is 45°. The reflection film 320 is coated on the hypotenuse 33 of the transparent glass 310.

In operation, the red light source 121, the green light source 122 and the blue light source 123 respectively emit red light, green light, and blue light, which approaches the light guide plate 11 through the first light incident surface 111 and is optically combined as a uniformly mixed light by the light guide plate 11. The combined light exits the light guide plate 11 through the first light output surface 112 and then concentrated by the concentrating lens 200 into a concentrated light. The concentrated parallel light enters the polarizing splitter 21, and is split into the s-polarization light and the p-polarization light. The s-polarization light is reflected by the polarizing splitting surface 211 onto the LCOS panel 22, and then modulated into the light with display information signal. The p-polarization light passes through the polarizing splitting surface 211 of the polarizing splitter 21 and enters the reflection device 30. The p-polarization light is reflected into the projection lens 40 by the reflection film 320. The projection lens 40 can project the p-polarization light onto a screen (not shown). In the disclosure, loss of the p-polarization light at the polarizing splitting surface 211 can be avoided, and the utilization ratio of the light source optimized, with brightness improved accordingly.

It should be understood that the shape of the transparent glass 30 is not limited to a rectangle, but can be any shape depending on requirements, for example, oblique triangle, as long as an included angle between a side of the transparent glass 30 coated by the reflection film 320 and the first mounting surface 213 of the polarizing splitter 21 is not less than 30°.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A projection system comprising:
   a light source module for emitting a red light, a green light and a blue light;
   a light guide plate configured for optically combining the red light, the green light, and the blue light, the light guide plate comprising a first light incident surface, a first light output surface and a light reflection surface, the light source module aligned with the first light incident surface;
   a polarizing splitter (PBS) module comprising a polarizing splitter and a LCOS panel, the polarizing splitter comprising a second light incident surface facing to the first light output surface, a first mounting surface opposite to the second light incident surface, a second mounting surface connecting the second light incident surface and the first mounting surface, a second light output surface opposite to the second mounting surface, the polarizing splitter configured for reflection an s-polarization light and allowing a p-polarization light to pass therethrough, the LCOS panel positioned on the second mounting surface and configured for modulating the s-polarization light into light with display information signal and also reflecting the light with display information signal to a projection lens facing to the second light output surface; and
   a reflection device positioned on the first mounting surface and configured for reflection the p-polarization light passing through the PBS module into the projection lens for projecting, wherein the reflection device comprises a transparent glass and a reflection film coated on the transparent glass, the transparent glass is rectangular triangle in shape and comprises a first side, a second side, and a hypotenuse connected between the first and second sides, the first side is positioned on the first mounting surface of the polarizing splitter, the reflection film is coated on the hypotenuse.

2. The projection system of claim 1, wherein the light source module comprises a red light source for emitting the red light, a green light source for emitting the green light and a blue light source for emitting the blue light, the red light source, the green light source, and the blue light source are arranged on the first light incident surface.

3. The projection system of claim 1, wherein the light guide plate is substantially rectangular in shape, the first light output surface and the light reflection surface are located at opposite sides of the light guide plate, and the first light incident surface is connecting the first light output surface and the light reflection surface.

4. The projection system of claim 1, wherein the polarizing splitter is formed by two isosceles right angle prisms, a polarizing splitting surface is located between two contacting surfaces of the two isosceles right angle prisms, the polarizing splitting surface is configured for reflecting the s-polarization light and allowing the p-polarization light to pass therethrough.

5. The projection system of claim 1, further comprising a concentrating lens arranged between the light guide plate and the PBS module.

6. The projection system of claim 5, wherein the concentrating lens is a Fresnel lens.

7. The projection system of claim 1, wherein an included angle between the first side and the hypotenuse is 4520.

8. A projection system comprising:
   a light source module for emitting a red light, a green light and a blue light;
   a light guide plate configured for optically combining the red light, the green light, and the blue light, the light guide plate comprising a first light incident surface, a first light output surface and a light reflection surface, the light source module aligned with the first light incident surface;
   a polarizing splitter (PBS) module comprising a polarizing splitter and a LCOS panel, the polarizing splitter comprising a second light incident surface facing to the first light output surface, a first mounting surface opposite to the second light incident surface, a second mounting surface connecting the second light incident surface and the first mounting surface, and a second light output surface opposite to the second mounting surface, the polarizing splitter configured for reflection an s-polarization light and allowing a p-polarization light to pass therethrough, the LCOS panel positioned on the second mounting surface and configured for modulating the s-polarization light into light with display information signal and also reflecting the light with display information signal to a projection lens facing to the second light output surface; and
   a reflection device positioned on the first mounting surface and configured for reflection the p-polarization light passing through the PBS module into the projection lens for projecting.

9. The projection system of claim 8, wherein the light source module comprises a red light source for emitting the red light, a green light source for emitting the green light and a blue light source for emitting the blue light, and all of the red light source, the green light source, and the blue light source are arranged on the first light incident surface.

10. The projection system of claim 8, wherein the light guide plate is substantially rectangular in shape, the first light output surface and the light reflection surface are located at opposite sides of the light guide plate, and the first light incident surface is connecting the first light output surface and the light reflection surface.

11. The projection system of claim 8, wherein the polarizing splitter is formed by two isosceles right angle prisms, the polarizing splitter comprises a polarizing splitting surface located between two contacting surfaces of the two isosceles right angle prisms, and the polarizing splitting surface is configured for reflecting the s-polarization light and allowing the p-polarization light to pass therethrough.

12. The projection system of claim 8, further comprising a concentrating lens arranged between the light guide plate and the PBS module.

13. The projection system of claim 12, wherein the concentrating lens is a Fresnel lens.

* * * * *